United States Patent
Lee et al.

(10) Patent No.: US 8,275,170 B2
(45) Date of Patent: Sep. 25, 2012

(54) APPARATUS AND METHOD FOR DETECTING HORIZON IN SEA IMAGE

(75) Inventors: Jae Kwang Lee, Taejon (KR); Chang Joon Park, Taejon (KR); In Ho Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 1312 days.

(21) Appl. No.: 11/952,811

(22) Filed: Dec. 7, 2007

(65) Prior Publication Data

US 2008/0137960 A1   Jun. 12, 2008

(30) Foreign Application Priority Data

Dec. 8, 2006  (KR) .................. 10-2006-0124930
Feb. 9, 2007  (KR) .................. 10-2007-0013901
Sep. 10, 2007 (KR) .................. 10-2007-0091684

(51) Int. Cl.
*G06K 9/00* (2006.01)
*G06K 9/48* (2006.01)
*G06K 9/46* (2006.01)

(52) U.S. Cl. ........ 382/103; 382/199; 382/203; 382/282; 701/21; 348/113; 348/143

(58) Field of Classification Search .................. 382/103, 382/199, 203, 282; 701/21; 348/113–124, 348/143–149
See application file for complete search history.

(56) References Cited

U.S. PATENT DOCUMENTS

| | | | | |
|---|---|---|---|---|
| 4,263,726 A | * | 4/1981 | Bolton | 434/43 |
| 4,672,205 A | * | 6/1987 | Sodeikat | 250/338.1 |
| 4,866,626 A | * | 9/1989 | Egli | 701/523 |
| 5,027,413 A | * | 6/1991 | Barnard | 382/103 |
| 5,214,720 A | * | 5/1993 | Fety et al. | 382/100 |
| 5,262,953 A | * | 11/1993 | de Waard et al. | 701/531 |
| 5,279,301 A | * | 1/1994 | Tsukaya et al. | 600/442 |
| 5,287,176 A | * | 2/1994 | Stolle et al. | 378/98.7 |
| 5,576,964 A | * | 11/1996 | Choate | 701/514 |

(Continued)

FOREIGN PATENT DOCUMENTS

KR   20010102718   11/2001

(Continued)

OTHER PUBLICATIONS

S. M. Ettinger et al., "Vision-Guided Flight Stability and Control for Micro Air Vehicles," Proc. IEEE Int. Conf. on Intelligent Robots and Systems, vol. 3, pp. 2134-2140, 2002.

(Continued)

*Primary Examiner* — Aaron W Carter
(74) *Attorney, Agent, or Firm* — Rabin & Berdo, P.C.

(57) ABSTRACT

Provided is an apparatus and method for detecting a horizon which is necessary to detect a camera movement when compositing sea images in a marker-free sea-image camera tracking system. In the method, an ROI is selected near a horizon in a still image of the moving image of the sea, and each maximum point corresponding to the maximum brightness difference is detected from brightness differences between two pixels of each pair having two symmetrical pixels in each column of the ROI. The horizon is detected through a line-fitting using the maximum points. Therefore, the result of horizon detection can be very stable and a horizon can be easily detected in a sea scene having hundreds of frames.

16 Claims, 4 Drawing Sheets

U.S. PATENT DOCUMENTS

| | | | |
|---|---|---|---|
| 5,790,403 A * | 8/1998 | Nakayama | 701/28 |
| 5,982,915 A * | 11/1999 | Doi et al. | 382/130 |
| 6,314,137 B1 * | 11/2001 | Ono et al. | 375/240 |
| 6,361,910 B1 | 3/2002 | Sarig et al. | |
| 6,574,366 B1 | 6/2003 | Fan | |
| 6,778,699 B1 * | 8/2004 | Gallagher | 382/165 |
| 6,925,206 B2 | 8/2005 | Akutagawa | |
| 6,990,397 B2 * | 1/2006 | Albou et al. | 701/49 |
| 7,079,707 B2 | 7/2006 | Baron | |
| 7,124,008 B2 * | 10/2006 | Brun et al. | 701/49 |
| 7,398,016 B2 * | 7/2008 | Cheng | 396/234 |
| 7,583,858 B2 * | 9/2009 | Gallagher | 382/296 |
| 8,068,701 B2 * | 11/2011 | Ujisato et al. | 382/305 |
| 2001/0021277 A1 * | 9/2001 | Hamamura | 382/289 |
| 2003/0098869 A1 * | 5/2003 | Arnold et al. | 345/589 |
| 2004/0167697 A1 * | 8/2004 | Albou et al. | 701/49 |
| 2004/0178738 A1 * | 9/2004 | Brun et al. | 315/82 |
| 2005/0175980 A1 * | 8/2005 | Libutti et al. | 435/4 |
| 2006/0078214 A1 * | 4/2006 | Gallagher | 382/254 |
| 2006/0131478 A1 * | 6/2006 | Alden | 250/208.1 |
| 2007/0002275 A1 * | 1/2007 | Yan et al. | 351/200 |
| 2007/0188734 A1 * | 8/2007 | Waquet | 356/4.01 |
| 2007/0291177 A1 * | 12/2007 | Lahoz et al. | 348/571 |
| 2008/0056619 A1 * | 3/2008 | Ujisato et al. | 382/305 |
| 2008/0137960 A1 * | 6/2008 | Lee et al. | 382/195 |
| 2009/0174784 A1 * | 7/2009 | Karlsson et al. | 348/222.1 |

FOREIGN PATENT DOCUMENTS

| | | |
|---|---|---|
| KR | 20030067199 | 8/2003 |
| KR | 20040035981 | 4/2004 |
| KR | 20040042470 | 5/2004 |

OTHER PUBLICATIONS

Ji Hwan Woo et al., "Robust Horizon and peak Extraction for Vision-based Navigation", IPIU 2005.

Terry D. Cornall et al., "Measuring Horizon Angle from Video on a Small Unmanned Air Vehicle" 2nd International Conference on Autonomous Robots and Agents, Dec. 13-15, 2004, Palmerston North, New Zealand.

Farzin Mokhtarian et al., "Robust Image Corner Detection Through Curvature Scale Space" IEEE Transactions on Pattern Analysis and Machine Intelligence, vol. 20, No. 12, (Dec. 1998), pp. 1376-1381.

* cited by examiner

APPARATUS AND METHOD FOR DETECTING HORIZON IN SEA IMAGE

BACKGROUND OF THE INVENTION

1. Field of the Invention

The present invention relates to an apparatus and method for detecting a horizon in a sea image, and more particularly, to an apparatus and method for detecting a horizon which is necessary to detect a camera movement when compositing sea images in a marker-free sea-image camera tracking system.

The present invention is drawn from a study conducted as a IT new driving force key technology development project of Ministry of Information and Communication (MIC), and Institute for Information Technology Advancement (IITA) [task reference number: 2005-S-003-02, task name: Photo-Realistic Digital Image Content Production Software].

2. Description of the Related Art

A compositing technique of computer graphics (CG) and real image is considerably developed in the movie industry and augmented reality. A camera movement at the moment of shooting should be detected for natural composition. It requires great effort and takes a lot of time to perform the composition in each frame by manual manipulation.

Recently, instead of the manual manipulation, various commercial softwares, such as Shake, Boujou, Matchmover, Combustion, etc., are used for image composition. The camera movement is calculated by detecting distinctive features between adjacent images in a series of images, matching the distinctive features, and using their correlation. However, in the case of a sea image having no distinctive features, the camera movement is calculated by floating marker buoys on the sea and using the maker buoys as the distinctive features like in a movie of "TROY". In this case, when the movie is shot, the marker buoys must be connected to ships. In addition, unlike a long-range shot is taken from a helicopter, when a close-range shot is taken from a neighboring ship, it is a problem the marker buoys are heavily moved by waves. Accordingly, the image composition is very difficult in most cases.

Information about a tilt, yaw, etc. of a camera can be obtained using horizon information without markers in the sea image. In general, a horizon of the sea image can be detected using the Radon or Hough transform, which is used to detect a straight line from a sea image. However, the horizon cannot be detected using the line detection process because the horizon is blurred due to wet fog when weather condition is bad.

SUMMARY OF THE INVENTION

Accordingly, the present invention is directed to an apparatus and method for detecting a horizon in a sea image, which substantially obviates one or more problems due to limitations and disadvantages of the related art.

It is an object of the present invention to provide an apparatus and method for detecting a horizon in a sea image. In the apparatus and method, a region-of-interest (ROI) is selected near a horizon in a still image of the moving image of the sea, each maximum point corresponding to the maximum brightness difference is detected from brightness differences between two pixels of each pair having two symmetrical pixels in each column of the ROI, and the horizon is detected through a line-fitting using the maximum points.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an apparatus for detecting a horizon in a sea image, including: an ROI detection unit for detecting the coordinates of an ROI selected in each still image corresponding to each frame of the moving image of the sea; and a control unit for detecting the horizon corresponding to a line-fitting in the ROI of the each still image determined by the detected coordinates.

The still image may be adjusted in contrast and Gaussian-filtered. The still image may be adjusted in contrast according to a previously set value. The still image may be adjusted in contrast under control of the control unit.

The ROI detection unit may detect the coordinates of the ROI in a first still image among the each still image corresponding to the each frame.

The line-fitting may be performed by computing respective brightness differences between every two pixels disposed in vertical symmetry about each pixel in the ROI, detecting a pixel, i.e., a maximum point, corresponding to a maximum brightness difference in the each column of the ROI, and using the computed maximum points. The each column may mean all columns in the ROI.

The control unit may assign the same file name to a plurality of still images corresponding to the moving image of the sea, and assign serial numbers to each of the still images sequentially, so that the each scanned still image may be processed in package later.

The control unit may receive a left-upper-point and a right-lower-point from the ROI detection unit to designate the ROI.

In another aspect of the present invention, there is provided a method for detecting a horizon in a sea image, including the steps of: designating an ROI in each still image corresponding to each frame of the moving image of the sea; and detecting the horizon corresponding to a line-fitting in the ROI of the each still image.

The each still image may be adjusted in contrast and Gaussian-filtered.

The ROI may be selected in a first still image among the each still image corresponding to the each frame.

The coordinates of the ROI may be obtained by using a left-upper-point and a right-lower-point provided from an input unit.

The line-fitting may be performed by computing respective brightness differences between every two pixels disposed in vertical symmetry about each pixel in each column in the ROI, detecting a pixel, i.e., a maximum point, corresponding to a maximum brightness difference in the each column of the ROI, and using the computed maximum points. The each column may mean all columns in the ROI. The line-fitting may includes the steps of obtaining a center among all of the maximum points; and shifting the maximum points to the center. The step of detecting a horizon may include the steps of: calculating parameters a and b as Eigenvalues of the following matrix A of $$A = \begin{bmatrix} \sum xrel(i)^2 & \sum xrel(i) * yrel(i) \\ \sum xrel(i) * yrel(i) & \sum yrel(i)^2 \end{bmatrix}$$

where the shifted maximum points are xrel(i) and yrel(i), respectively; and calculating parameter c by substituting the parameter a and b and the center coordinates (xm, ym) into a line equation of ax+by+c=0, and calculating the constant a, b and c of a horizon equation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

For convenience of description, the same names and symbols are used to refer to the same elements as the related art and their detailed description will be omitted.

Figure 1:
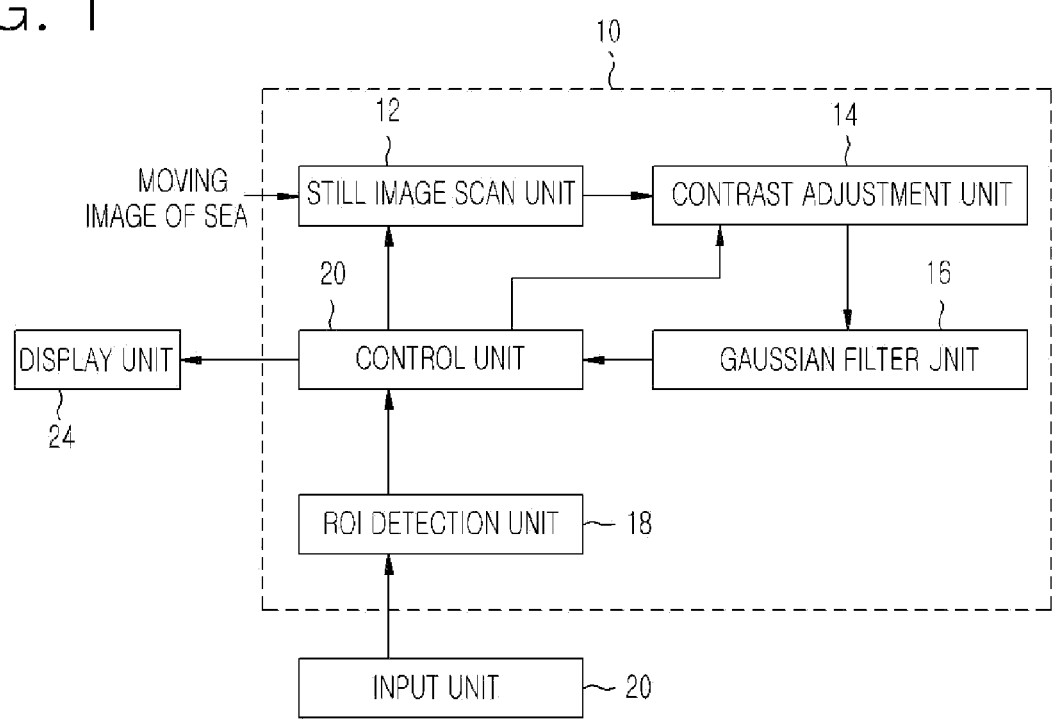
FIG. 1 is a block diagram of a horizon detecting apparatus according to an embodiment of the present invention.
Figure 2:
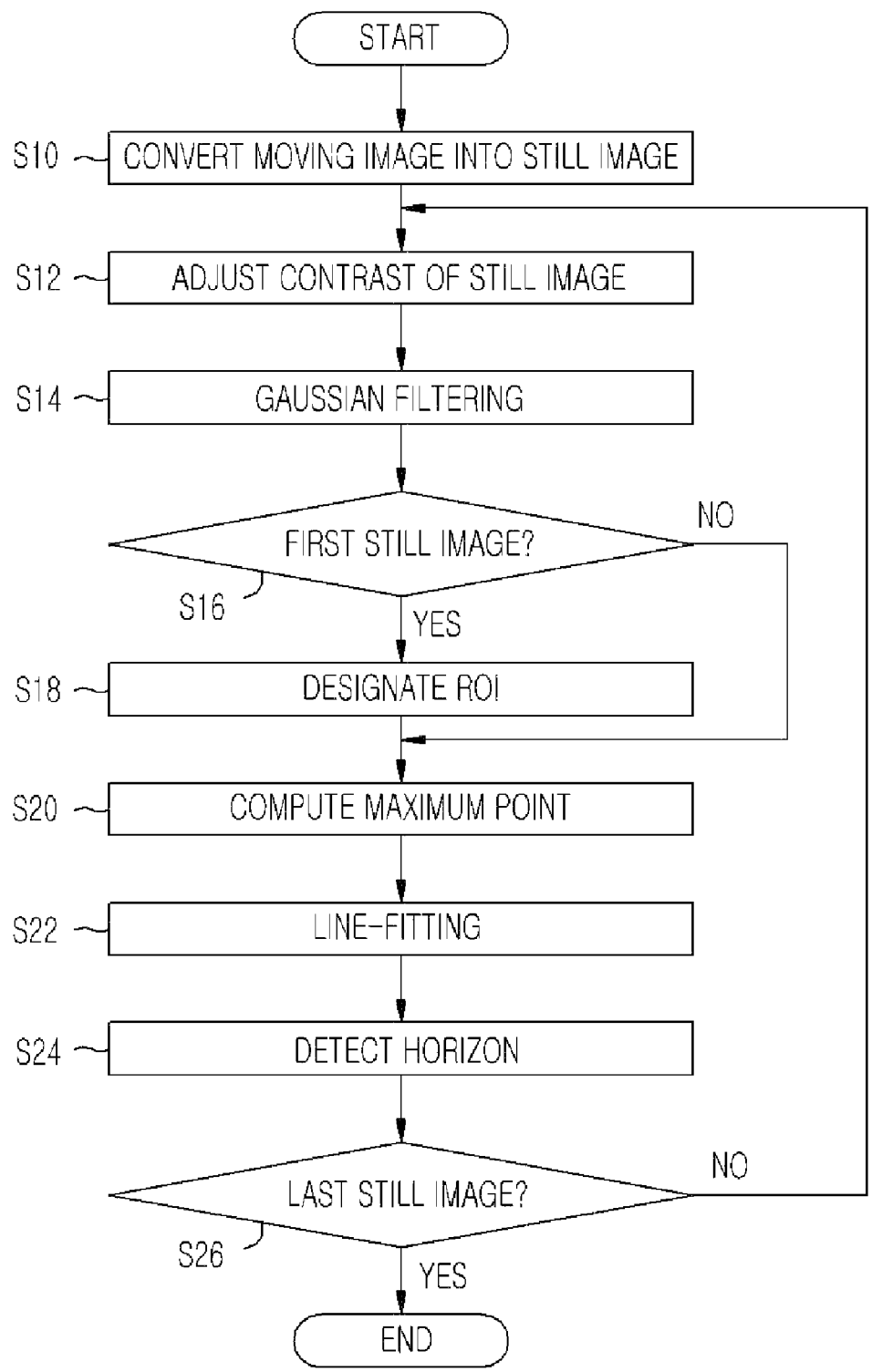
FIG. 2 is a flowchart of a horizon detecting method according to an embodiment of the present invention.
Figure 3:
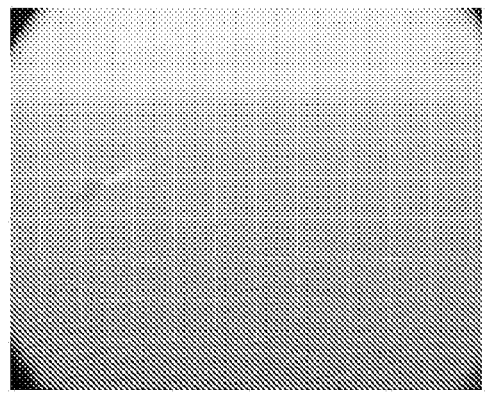
FIG. 3 illustrates an original sea image having a blurred horizon.
Figure 4:
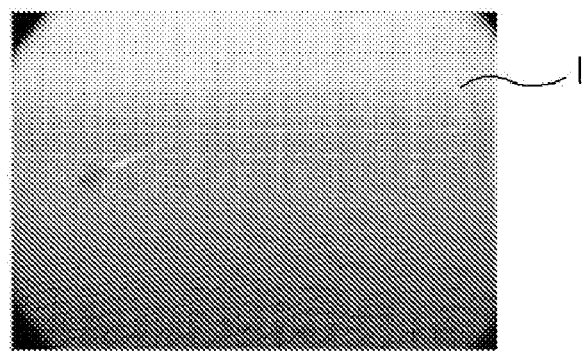
FIG. 4 illustrates a designated ROI in a first still image in the moving image of the sea.

FIG. 1 is a block diagram of a horizon detecting apparatus according to an embodiment of the present invention, FIG. 2 is a flowchart of a horizon detecting method according to an embodiment of the present invention, FIG. 3 illustrates an original sea image having a blurred horizon, and FIG. 4 illustrates a designated ROI in a first still image in the moving image of the sea.

Referring to FIGS. 1 to 4, the horizon detecting apparatus 10 of FIG. 1 includes a still image scan unit 12, a contrast adjustment unit 14, a Gaussian filter unit 16, a region-of-interest (ROI) detection unit 18, and a control unit 20. The horizon detecting apparatus 10 is connected to an external input unit 22 and an external display unit 24.

The still image scan unit 12 scans each frame of the moving image of the sea, generates corresponding still images, and provides the corresponding still images to the contrast adjustment unit 14 (see S10 in FIG. 2). The corresponding still images forming the moving image of the sea have the same file name and serial numbers so as to be processed in package later. Accordingly, the control unit 20 assigns the same file name and serial numbers to the corresponding still images forming the moving image of the sea, so that the corresponding still images can be processed in package later. For example, the control unit 20 assigns the same file name to each scanned still image corresponding to each frame in the moving image of the sea provided through the Gaussian filter unit 16, and assigns serial numbers to the each scanned still image sequentially, the each scanned still image being processed in package later.

The contrast adjustment unit 14 adjusts the contrast of the scanned still image, as illustrated in FIG. 3, which is provided by the still image scan unit 12 (see S12 in FIG. 2). The contrast adjustment unit 14 adjusts appropriately the contrast so as to prevent loss of horizon information. The degree of the adjustment may be previously set in the contrast adjustment unit 14 and may be set under control of the control unit 20. That is, the contrast adjustment unit 14 adjusts the contrast of the each scanned still image provided from the still image scan unit 12 according to a previously set degree or the control of the control unit 20.

The boundary region of an object (i.e., edge pixels) has relatively high spatial frequency. Thus, a Gaussian filter is used to reduce noise in an image having high spatial frequency. The Gaussian filter unit 16 performs Gaussian filtering on the contrast-adjusted still images provided from the contrast adjustment unit 14, and outputs a first Gaussian-filtered still image as illustrated in FIG. 4 (see S14 in FIG. 2). The Gaussian filter unit 16 performs Gaussian filtering sequentially on the contrast-adjusted still images provided sequentially from the contrast adjustment unit 14 to provide the Gaussian-filtered still images to the control unit 20.

The ROI detection unit 18 receives the coordinates of an ROI (I) inputted through the dragging operation of a mouse as the input unit 22. The ROI detection unit 18 applies the received coordinates to the first Gaussian-filtered still image. That is, in the first Gaussian-filtered still image, the control unit 20 recognizes the ROI (I). Since a method of inputting coordinates using a mouse as the input unit 22 is well known, its detailed description will be omitted.

In order to reduce computational amount, the control unit 20 designates an ROI (that is obtained in the ROI detection unit 18) in the first Gaussian-filtered still image provided from the Gaussian filter unit 16 (see S16 and S18 in FIG. 2). When the control unit 20 designates the ROI, the control unit 20 receives a left-upper-point and a right-lower-point of the ROI from the input unit 22 through the ROI detection unit 18. The ROI detection unit 18 computes coordinates corresponding to a region inputted by the input unit 22 in order that the control unit 20 may recognize the inputted region through the detected coordinates. Then, the ROI detection unit 18 transmits the obtained coordinates to the control unit 20. For example, when it is assumed that a designated ROI is a matrix, if the coordinates of a left-upper-point and the coordinates of a right-lower-point in the designated ROI are (X1, Y1) and (X2, Y2), respectively, the coordinates of the right-lower-point is (X2−X1+1, Y2−Y1+1) when the coordinates of the left-upper-point is (1, 1). Through following operations S20, S22 and S24, the control unit 20 detects a horizon within the ROI determined by the coordinates inputted from the ROI detection unit 18. Then, the control unit 20 controls the display unit 24 to display the detected horizon. The operations performed in the control unit 20 are described in detail below with reference to FIGS. 5 to 7.

Figure 5:
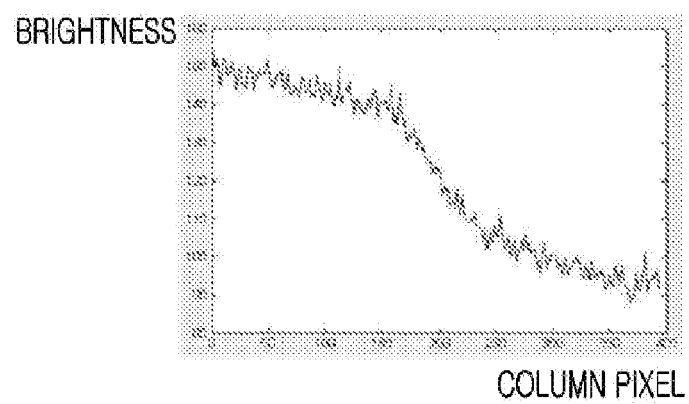
FIG. 5 is a graph illustrating a brightness distribution of each pixel in a column in the ROI designated in FIG. 4.

FIG. 5 is a graph illustrating a brightness distribution of each pixel in a column in the ROI (I) designated in FIG. 4. Specifically, FIG. 5 illustrates the brightness distribution corresponding to from the first row to the last row in an arbitrary column of the designated ROI matrix.

Referring to FIG. 5, it is difficult to definitely determine the exact position of object's edge when a still image is blurred.

Accordingly, the control unit 20 computes respective brightness differences between every two pixels disposed in vertical symmetry about each pixel in the ROI of the Gaussian-filtered still image provided from the Gaussian filter unit 16. The control unit 20 detects a pixel, i.e., a maximum point, corresponding to a maximum brightness difference in each column (see S20 in FIG. 2). For example, when an ROI has a thousand of columns, a thousand of maximum points are obtained because one maximum point is detected in each column. The control unit 20 computes a brightness difference every two symmetrical pixels with respect to a center pixel. Each pixel in the ROI (I) serves as the center pixel. The upper pixel of the two symmetrical pixels locates at 60 pixels above the center pixel (+60), and the lower pixel locates at 60 pixels below the center pixel (−60). The brightness differences are calculated using Equation 1 below.

$$ROI(i,j)=I(i+60,j)-I(i-60,j) \qquad \text{Equation 1}$$

In Equation 1, ROI(i, j) denotes $i^{th}$ column and $j^{th}$ row in the designated ROI matrix and I(i, j) denotes $i^{th}$ column and $j^{th}$ row in an input image. In experimental result of a 2048×1556 still image obtained by scanning common movie scene, the best result in detecting a horizon is achieved when a distance between the two symmetrical pixels is 120 pixels. Therefore, +60 and −60 are used.

Figure 6:
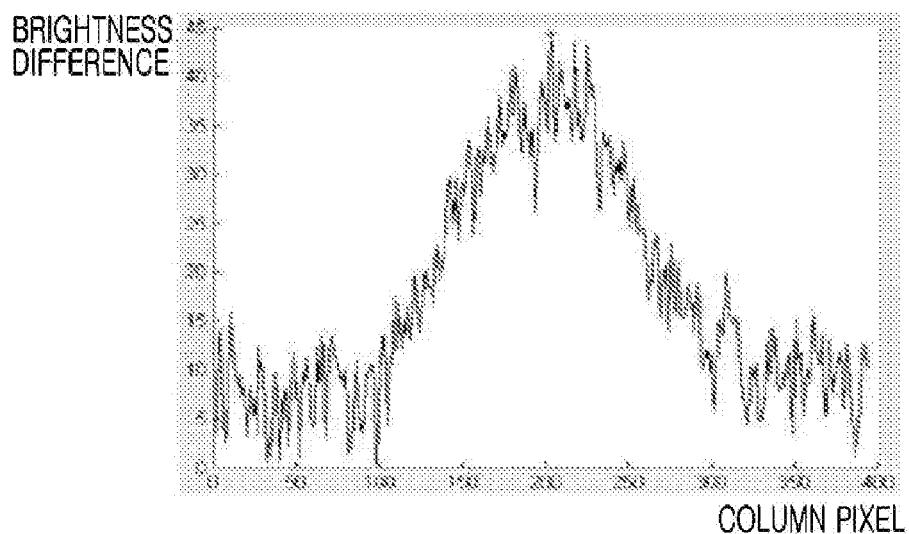
FIG. 6 is a graph illustrating a brightness difference distribution and a maximum point.

FIG. 6 is a graph illustrating a brightness difference distribution and a maximum point. The graph is a result obtained by applying Equation 1 to the ROI. It is assumed that a pixel corresponding to a maximum brightness difference is an edge in a corresponding column.

The brightness in FIGS. 5 and 6 is represented by 250 gray levels.

Figure 7:
FIG. 7 is an image illustrating a horizon obtained by using each maximum point computed in each column.

FIG. 7 is an image illustrating a horizon obtained using each maximum point computed by Equation 1 in each column. The control unit 20 performs a line-fitting by using the maximum points and obtains the horizon corresponding to the line-fitting (see S22 and S24 in FIG. 2).

For example, the center among the maximum points is obtained in order to determine the most appropriate line among the scattered maximum points, and each maximum point is shifted to the center. When it is assumed that each shifted point is xrel(i) and yrel(i), Eigenvalues of the following matrix A become parameters a and b, respectively.

$$A = \begin{bmatrix} \sum xrel(i)^2 & \sum xrel(i)*yrel(i) \\ \sum xrel(i)*yrel(i) & \sum yrel(i)^2 \end{bmatrix}$$

The parameters a and b obtained using the matrix A and the center coordinates (xm, ym) are substituted into a line equation of ax+by+c=0 to determine the constant c. Therefore, parameters a, b and c required in a horizon equation can be obtained.

Under the control of the control unit 20, the control unit 20 performs the step S10 when a Gaussian-filtered still image provided from the Gaussian filter unit 16 is not the last still image, and performs the steps S12, S14, S16, S18, S20, S22 and S24 for each still image until the last still image (see S26 in FIG. 2). The steps S12, S14, S20, S22 and S24 are performed for a second still image to the last still image generated in step S10 because the ROI need not be selected again for the still images.

According to the present invention, a horizon can be detected when the horizon cannot be detected using the Radon or Hough transform because the horizon is blurred.

The method of the present invention can be implemented by a program and stored in a computer-readable medium, e.g., a CD-ROM, a RAM, a floppy disk, a hard disk, an optical magnetic disk, etc.

As described the above, an ROI is selected near a horizon in a still image of the moving image of the sea, each maximum point corresponding to the maximum brightness difference is detected from brightness differences between two pixels of each pair having two symmetrical pixels in each column of the ROI. The horizon is detected through a line-fitting using the maximum points.

Therefore, the result of horizon detection can be very stable and a horizon can be easily detected in a sea scene having hundreds of frames.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus, comprising:
a region-of-interest (ROI) detection unit that detects coordinates of an ROI selected in a still image corresponding to a frame of a moving sea image; and
a control unit that
detects a horizon corresponding to a line-fitting in the ROI of the still image determined by the detected coordinates,
calculates parameters a and b as Eigenvalues of the following matrix A, $$A = \begin{bmatrix} \sum xrel(i)^2 & \sum xrel(i)*yrel(i) \\ \sum xrel(i)*yrel(i) & \sum yrel(i)^2 \end{bmatrix},$$

where the shifted maximum points are xrel(i) and yrel(i), respectively,
calculates a parameter c by substituting the parameters a and b and center coordinates (xm, ym) into a line equation expressed as ax+by+c=0, and
uses the calculated parameters a, b and c in a horizon equation.

2. The apparatus of claim 1, wherein the still image is adjusted in contrast and is Gaussian-filtered.

3. The apparatus of claim 2, wherein the still image is adjusted in contrast according to a previously set value.

4. The apparatus of claim 2, wherein the still image is adjusted in contrast under control of the control unit.

5. The apparatus of claim 1, wherein the ROI detection unit detects coordinates of the ROI in a first still image among a plurality of still images corresponding to a plurality of frames of the moving sea image.

6. The apparatus of claim 1, wherein the line-fitting is performed by for a plurality of pixels in the ROI, each pixel having two pixels disposed in vertical symmetry thereabout, computing respective brightness differences between the two pixels, and detecting a maximum point corresponding to a maximum brightness difference in a column of the ROI including the plurality of pixels.

7. The apparatus of claim 6, wherein the maximum point is detected for each of a plurality of columns in the ROI.

8. The apparatus of claim 1, wherein the control unit assigns a same file name to the still images corresponding to the moving sea image, and assigns a serial number to each of the still images.

9. The apparatus of claim 1, wherein the coordinates detected by the ROI detection unit are obtained from a left-upper-point and a right-lower-point.

10. A method, comprising:

designating an ROI (region-of-interest) in a still image corresponding to a frame of a moving sea image;

detecting a horizon corresponding to a line-fitting in the ROI of the still image;

calculating parameters a and b as Eigenvalues of the following matrix A, $$A = \begin{bmatrix} \sum xrel(i)^2 & \sum xrel(i) * yrel(i) \\ \sum xrel(i) * yrel(i) & \sum yrel(i)^2 \end{bmatrix}$$

where the shifted maximum points are xrel(i) and yrel(i), respectively;

calculating a parameter c by substituting the parameters a and b and center coordinates (xm, ym) into a line equation expressed as ax+by+c=0; and using the calculated parameters a, b and c in a horizon equation.

11. The method of claim 10, further comprising adjusting the still image in contrast and Gaussian-filtering the still image.

12. The method of claim 10, further comprising selecting a first still image from among a plurality of still images each corresponding to a frame of the moving sea image.

13. The method of claim 10, further comprising determining the ROI using coordinates obtained from a left-upper-point and a right-lower-point.

14. The method of claim 10, wherein performing the line-fitting includes for a plurality of pixels in the ROI, each pixel having two pixels disposed in vertical symmetry thereabout, computing respective brightness differences between the two pixels, and detecting a maximum point corresponding to a maximum brightness difference in a column of the ROI including the plurality of pixels.

15. The method of claim 14, wherein performing the line-fitting further includes detecting the maximum point for each of a plurality of columns in the ROI.

16. The method of claim 15, wherein the line-fitting further comprises:

obtaining a center among the maximum points; and shifting the maximum points to the center.

* * * * *